United States Patent [19]

Scharfe

[11] Patent Number: 5,121,789

[45] Date of Patent: Jun. 16, 1992

[54] WARM CLIMATE SOLAR BUILDING

[76] Inventor: Ronald E. Scharfe, P.O. Box 160098, Austin, Tex. 78716

[21] Appl. No.: 738,898

[22] Filed: Aug. 1, 1991

[51] Int. Cl.[5] .............................. F24J 2/42; F24J 3/02
[52] U.S. Cl. .................................. 165/48.2; 126/400; 126/430; 126/431
[58] Field of Search ........................ 126/400, 430, 431; 165/48.1

[56] References Cited

U.S. PATENT DOCUMENTS

| | | | |
|---|---|---|---|
| 4,103,825 | 8/1978 | Zornig | 126/400 |
| 4,128,204 | 12/1978 | Wade | 126/400 |
| 4,173,304 | 11/1979 | Johnson | 126/400 |
| 4,227,566 | 10/1980 | Stiller | 126/431 |
| 4,232,821 | 11/1980 | Backlund | 126/431 |
| 4,234,037 | 11/1980 | Rogers et al. | 126/400 |
| 4,244,519 | 1/1981 | Zornig et al. | 126/400 |
| 4,250,885 | 2/1981 | Van Heel | 126/400 |
| 4,373,573 | 2/1983 | Madwed | 126/430 |
| 4,420,036 | 12/1983 | Blaser | 126/430 |
| 4,552,205 | 11/1985 | Saunders | 126/430 |

FOREIGN PATENT DOCUMENTS

| | | | |
|---|---|---|---|
| 0211636 | 9/1986 | Japan | 126/430 |
| 1195148 | 11/1985 | U.S.S.R. | 126/431 |
| 1451480 | 1/1989 | U.S.S.R. | 126/430 |

*Primary Examiner*—John K. Ford

[57] ABSTRACT

A solar concrete slab building specifically for a warm climate area including a motorized blower fan and duct means connecting solar wall collectors or cool ambient air to a unique pattern of mutliple air flow tubes embedded in the concrete slab and out an exhaust duct chase of thermal mass, provide means for preventing said air from contacting the interior of the building, thereby creating heat exchange type air flow paths within that heat or cool the thermal mass of the slab and chase. Hence, the occupant can direct off-time cycle temperature storage techniques to better moderate the interior heat in the warm season or the interior cold in the cold season.

1 Claim, 2 Drawing Sheets

WARM CLIMATE SOLAR BUILDING

BACKGROUND OF THE INVENTION

1. Field of the Invention

The present invention relates to solar heated buildings, and in particular to such building structures that moderate the extreme interior temperature variations via use of off-time cycle thermal storage techniques in structural concrete slabs and interior massing.

2. Description of Prior Art

Currently, solar heated buildings comprised of solar air systems that use concrete slabs and interior massing for thermal storage have attained little success in the warmer climates of the world. To be economically feasible in mild winter locations, solar buildings of this type need to be cool more of the year than they need to be warm. This premise is not addressed in the current art in that all designs favor heating over cooling.

A solar heated building that works more favorably in the colder regions in U.S. Pat. No. 4,051,999, wherein the attic solar air collector provides heat for winter use via ductwork to the rock storage below the living area. In warmer climates, this patent and other similar ones involving roof or attic collectors do not address the overheating the building experiences in the summer months through the attic, thereby negating the smaller economic benefit of solar heating the structure in the winter.

Other detrimental aspects of current solar building art applied to warmer climates can be examined in U.S. Pat No. 4,296,798, in which an integral component of the system is a "ground contact stage," wherein cooling the structure is assisted by the cool earth underneath cooling the building slab. Such an arrangement would be negative to the cooling cycle in warm climates in that it is not unusual to encounter very high temperatures in the ground early in the warm season, thereby adding heat through thermal conduction and convection from the earth underneath the structure.

Additional related art adverse to warmer climate solar building applications should be noted by referring to U.S. Pat. No. 4,127,973 wherein the invention primarily relies on thermo-siphon circulating air through vertical air slots in the lower slab from the array of concrete blocks and rock thermal storage to the upper living areas and back. The undesirable results of this solution in warmer climate areas would be to invite the infestation of pests such as fire ants or rodents into the lower thermal storage below the living area. Similarly, odor problems exist with such applications as well as mold formation and entrapment of radon gas.

Consequently, as can be shown, prior inventions do not fully accomplish the more specific differences inherent in designing an economical and successful solar warm climate building. Whatever the precise merits, features, and advantages of the above-cited references, none of them achieves or fulfills the purposes of a warm climate solar building like the present invention.

SUMMARY OF THE INVENTION

The present invention consists of an improvement to a solar building comprising a concrete slab resting on foundation grade beams supporting the building enclosure above.

The principal object of the present invention is to more effectively control and moderate the temperature variations in a concrete slab solar heated building located in a warmer climate area, thereby better serving the comfort of the occupants.

Another object of the present patent is to provide a warmer climate location building with a cooling and heating system that further reduces requirements for burning fuels, thereby relying more on natural cooling and heating.

Another object of the invention is to provide a more simplified cooling and heating system which uses more standard "off the shelf" building materials, thereby aiding in an economic sense int he ease and simplicity of construction.

It is yet another object of the present invention to provide a healthier interior environment through a unique way of cooling and heating a solar building by the process of heat exchange, thereby eliminating the contact between the air in the thermal storage medium had the interior air of the building.

In fulfillment and implementation of the previously recited objects, a primary feature of the present invention resides in a completely thermally insulated concrete slab open only to the interior containing a plurality of air flow tubes embedded in a unique fashion in the concrete slab; one end of the plurality of air flow tubes is stubbed up collectively into an air collection box at the predominantly south quadrant of the building and the other end is collectively stubbed up to an exhaust duct chase of thermal mass.

Solar collectors integrated on a predominantly southern wall of the building are connected via ductwork to the aforementioned air collection box. Dampers located at the collection box introduce warm season cool ambient nighttime outside air or cold season warm ambient daytime solar collector air to the air flow tubes in the concrete slab.

The said exhaust duct chase of thermal mass coupled with the previously mentioned slab air flow tubes form an air flow path means to exhaust the air back outside the building. A motorized blower fan located within the exhaust duct of thermal mass controls the air flow as needed.

The combination of solar collectors, an air collector box, concrete slab air flow tubes, and exhaust chase mass from heat exchange type air flow paths that heat and cool the thermal mass of the slab and the exhaust chase, and prevent these said air flows from contacting the inside air of the building. Thus built, depending on the season of the year, the thermal mass of the building stores the cool early season of the year, the thermal mass of the building stores the cool early morning temperatures for hot afternoon days or the warm day temperatures for cold nights.

Further features of the invention will be apparent from the following specifications and claims when considered in connection with the accompanying drawings illustrating the preferred embodiment of the invention.

DESCRIPTION OF THE PREFERRED EMBODIMENT

Figure 1:
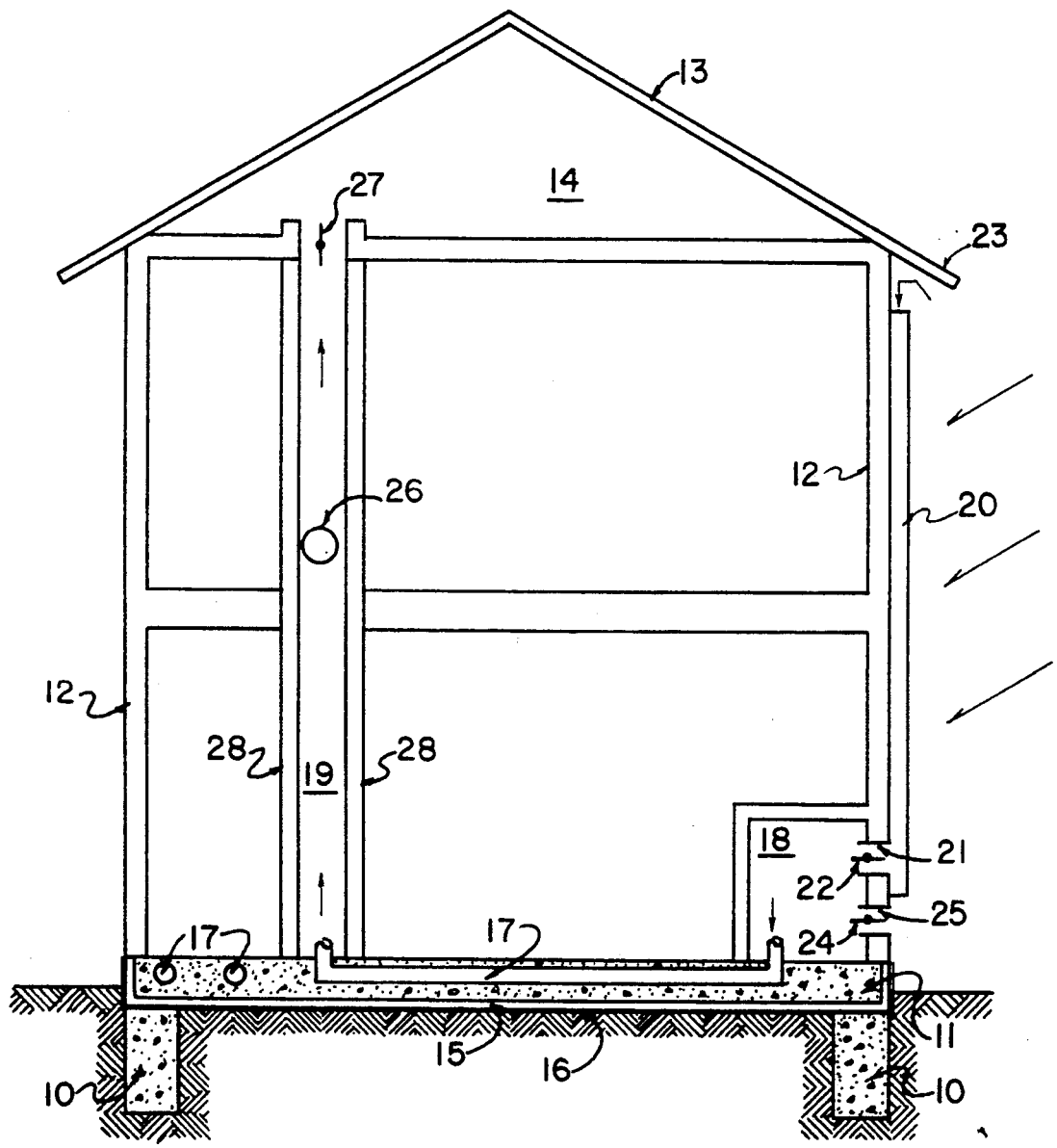
FIG. 1 is a vertical section through a building such as a house employing the features of the present invention.

Referring in more detail to FIG. 1 of the drawing, there is illustrated a building such as a house in vertical cross section. The house is constructed of grade beams 10 supporting a thickened concrete slab 11 which makes up a substantial entirety of the lower living area of the building. The building enclosure being of two stories is erected of walls 12 resting on the concrete slab 11. The roof section 13 extends upwardly from the second floor walls and terminates in an apex of the roof forming an attic space 14.

Figure 2:
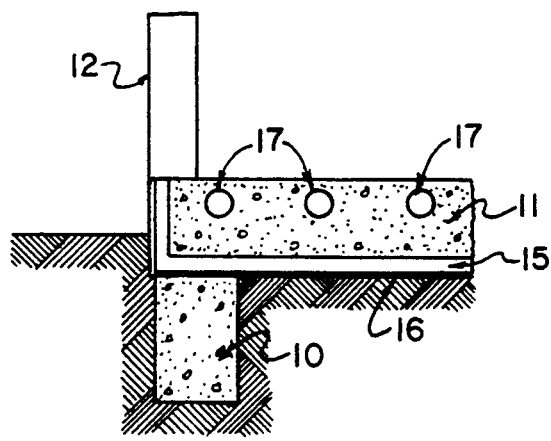
FIG. 2 is a vertical section of a portion of the concrete slab of the building taken along about lines 2—2 of FIG. 3.

Referring to FIG. 2, showing a more detailed drawing of the concrete slab 11, there is illustrated a layer of two inch insulating material 15 and a vapor barrier 16 completely encapsulating the concrete slab 11 on the exterior sides and bottom and sandwiched additionally between the grade beams 10 and the concrete slab 11. This procedure thermally insulates the concrete slab and forms the floor of the first story of the building thereby creating a thermal storage mass open only to the interior that can take heat away from or give heat to the interior of the enclosure without losing or gaining heat from the outside or the ground.

Embedded in the concrete slat is a plurality of air flow tubes 17 with one end of the plurality stubbed up collectively into an air collection box 18 at the predominantly south quadrant of the building and the other end collectively stubbed up to an exhaust duct chase of thermal mass 19. This plurality of tubes in the concrete slab forms multiple air flows paths that can deposit or take heat away from the inside of the concrete mass of the slab. Important to this is that the air tubes be within three inches of the top of the slab to accomplish a faster rate of heat exchange from the concrete slab to the interior of the building.

Figure 3:
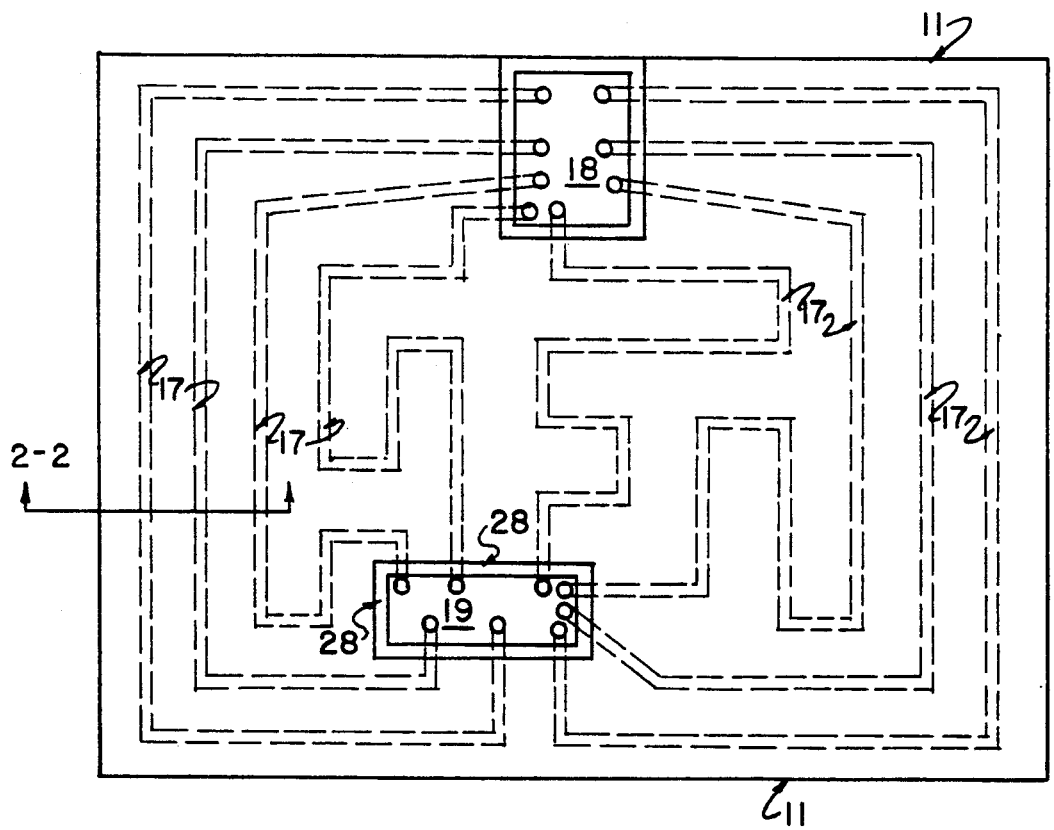
FIG. 3 is a horizontal section view at the floor of the building of FIGS. 1 and 2 illustrating the tube layout embedded in the concrete slab.

FIG. 3 illustrates on the floor plan of the concrete slab of the building a location for the air collection box 18 and the exhaust duct chase of thermal mass 19 where the plurality of air tubes would be stubbed up. This illustration shows a very important embodiment of the invention wherein the air flow tubes embedded in the concrete slab are laid out in a pattern parallel to the perimeter of the edge of the slab and an orthogonal pattern approaching the center of the slab. Such an arrangement allows for a more uniform length of air flow tubes between the air collection box and the exhaust duct chase of thermal mass, thereby providing for more even hot or cold temperature distribution throughout the mass of the concrete slab.

Returning to FIG. 1, on the predominantly south wall of the building are solar collectors 20 of generic design. The roof overhand 23 above the solar collectors provides for air inlets out of the rain for ambient air to enter the solar collectors and also provides some protection from the solar rays of the high altitudes sun in the warmer months. The extent of said overhang 23 is limited however, so as not to cut off the rays of the low altitude sun in the winter months.

Solar collectors 20 on the wall of the building are consistent with the intent of this patent in that the solar collectors only heat up when the sun is at a low altitude in the mild winters of a warm climate area. In the warm season of the same locale, through the shading of the roof overhang and the verticality of the solar collector, they become more of an insulator rather than a heat generator.

The solar collectors 20 are connected to the air collection box 18 by means of ductwork 21 and a mechanical damper 22. Importantly, the said air collection box is airtight with regard to the interior of the building and serves as a manifold distributing the ambient air coming from the solar collectors into the air tubes embedded in the concrete slab. The said mechanical damper 22 is closed in the warm months of the year and operates open only for the cold winter months, when warm winter daytime solar collected air needs to be routed through the air flow tubes in the concrete slab.

Conversely, also connected to the airtight collection box 18 is another mechanical damper 24 located in ductwork 25 routed directly to the outside ambient air; said mechanical damper 24 is closed in the cold months of the year and operated open only for the warm months, when the air collection box again serves like a manifold routing cool summer nighttime ambient air through the air flow tubes in the concrete slab.

Also illustrated in FIG. 1, another important element of the invention is the exhaust duct chase of mass 19, composed of solid walls of building blocks 28 having a large thermal storage capacity built around a void in the middle creating an air passage exhaust means to the outside from the air tubes stubbed up from the concrete slab. Similarly, as with the collection box 18, the said exhaust chase is crucially airtight with regard to the interior of the building. Moreover, the preferred location of the exhaust chase would be completely within the living space of the building of take full advantage of the thermal storage capacity of the stack. The exhaust chase of thermal mass, containing a motorized blower fan 26 that circulates air when switched on and a mechanical damper 27, complete the air flow path from the air flow tubes in the concrete slab to the attic 14 of the building. The attic 14 is vented to the outside by conventional means to allow the air to escape when the motorized blower fan is operating. Including this feature is consistent with the intent of the building in that it works to expel warm air from the attic at night in the warm months and introduce warm air into the attic during the cool days in the cold months. Hence, the air flow paths through the collection box, through the slab air flow tubes and out the exhaust duct chase of mass, form heat exchange type circulating air flow paths that heat or cool the thermal mass of the slab and exhaust chase of mass and prevent these said air flows from contacting the interior air of the building. By this means, all odors, radon gas, or molds are not allowed to get into the living interior of the building, but instead are expelled harmlessly outside.

The motorized blower fan 26 and exhaust chase mechanical damper 27 are controlled by a switch to operate a time clock for the warm months of the year or a switch to turn on a thermostat on the solar collector for the cold months of the year. The time clock in turn operates a mechanical damper, 24, whereas the thermostat in turn operates mechanical damper 22. Accordingly, during the warm season and under the cooling mode, the occupant closes a switch, for instance on the time clock, to allow the motorized blower fan 26 in the exhaust duct chase 19 to operate from 2 a.m. to 7 a.m. continuously. During this time the mechanical dampers 24 and 27 open and the motorized blower fan 26 circulates ambient cool air into the air collection box 18 through the air flow tubes in the concrete slab and out the exhaust duct chase of mass 29 to the attic. Cool thermal temperatures are thereby stored in the concrete slab and in the exhaust duct chase of mass. During the later warmer periods of the day the concrete slab and exhaust duct chase of mass take heat from the building by conduction and convection, thereby cooling the interior. All exterior windows and openings of the building are closed during the warm times of day to contain the cool air in the interior. Circulation of the cool interior air of the building can be by conventional ceiling or floor fans.

Similarly, during the cold season and under the heating mode, the occupant closes a switch to turn on a thermostat located at the solar collectors. During the sun periods of the day, the solar collectors heat up, closing the thermostat switch, which opens the mechanical dampers 22 and 27, and turns on the motorized blower fan 26 in the exhaust duct chase of mass, circulating warm air into the collection box through the air flow tubes in the concrete slab and out the exhaust duct chase of mass to the attic. Warm thermal temperatures are thereby stored in the concrete slab and the exhaust chase of mass. During the later colder nighttimes the concrete slab and the exhaust duct chase mass give up heat to the building by conduction and convection, thereby warming the interior. Similarly, all exterior windows and openings are closed during the cold times to contain the warm air in the interior of the building.

Thus, as illustrated, in a warm climate area the occupant of the building can direct the use of the aforementioned off-time cycle temperature storage techniques to better store temperatures in the concrete slab and the exhaust chase of thermal mass thereby moderating the daily interior extremes of heat in the warm season daytime and the interior extremes of cold in the cold season nighttime.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claim.

I claim:

1. In combination, a solar building comprised of a concrete slab resting on foundation grade beams supporting the building enclosure above, the improvement comprising:

grade beams supporting a thickened concrete slab which make up a substantial entirety of a lower living area of the building, insulating material encapsulating said concrete slab on the exterior sides and bottom thereof creating a thermal storage mass open only to the interior of the building, a plurality of air flow tubes embedded in said concrete slab with one end of the plurality stubbed up collectively into an air collection box and the other end collectively stubbed up to an exhaust duct chase of thermal mass passing upwardly through and exposed to the living area of the building to an attic space thereof and having a large thermal storage capacity, said embedded air flow tubes in a concrete slab laid out in a pattern parallel to the perimeter of the edge of the slab along one portion and an orthogonal pattern approaching the center along another portion, said air flow tubes having substantially uniform length, solar collectors on a predominantly south facing wall of the building connected to an air collection box by means of a first mechanical damper and first associated ductwork, a second mechanical damper and second associated ductwork routed directly to the outside ambient air from said collection box, said exhaust duct chase of thermal mass built around a void in the middle creating an air passage exhaust means to the outside from the air flow tubes stubbed up from the concrete slab, said exhaust duct chase of thermal mass containing a motorized blower fan that circulates air and a mechanical damper, means defining air flow paths through the collection box, through the concrete slab air flow tubes and out the exhaust duct chase of thermal mass and means of preventing these said air flow paths from contacting the interior air of the building, said air flow paths being circulating heat exchange type air flow paths that heat or cool the thermal mass of the concrete slab and exhaust chase, whereby the occupant can direct off-time cycle temperature storage techniques to better moderate the daily interior extremes of heat in the warm season and the daily interior extremes of cold in the cold season.

* * * * *